Feb. 3, 1953      A. A. OBERMAIER      2,627,543
IONIZATION TYPE GAS FLOWMETER
Filed Nov. 12, 1947
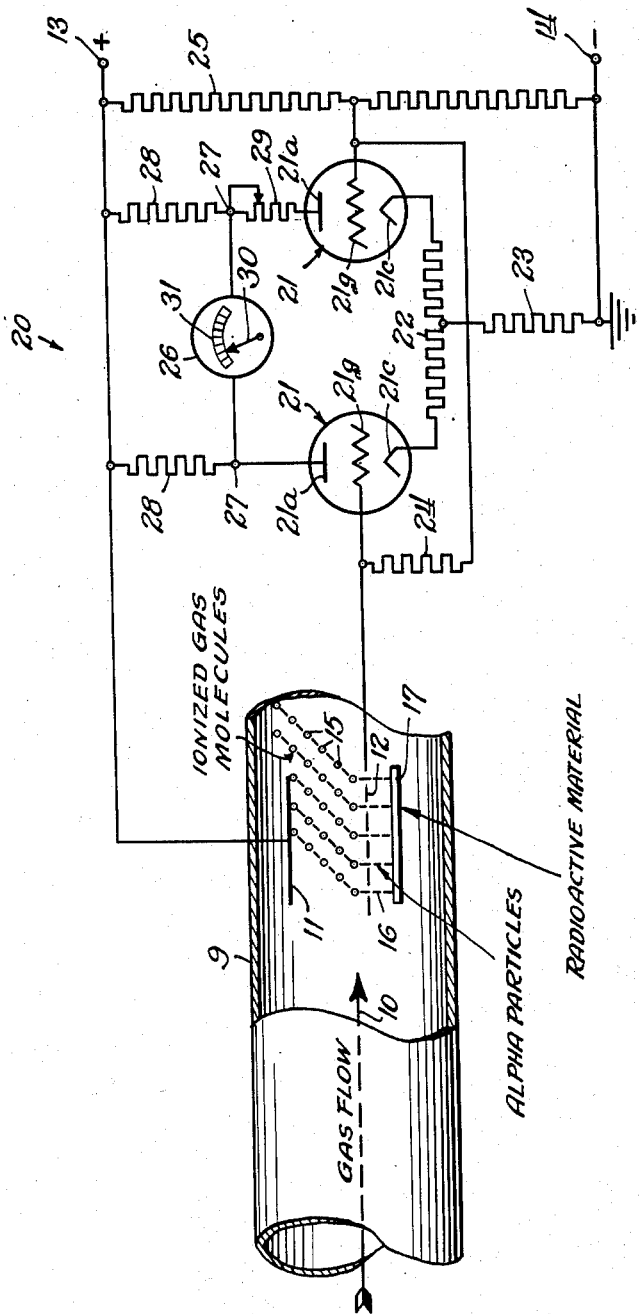
Inventor
Alfred A. Obermaier
By Brown, Jackson, Boettcher & Dienner
Att'ys Patented Feb. 3, 1953

2,627,543

UNITED STATES PATENT OFFICE 2,627,543

IONIZATION TYPE GAS FLOWMETER

Alfred A. Obermaier, Chicago, Ill., assignor to Illinois Testing Laboratories, Inc., Chicago, Ill., a corporation of Illinois Application November 12, 1947, Serial No. 785,239

1 Claim. (Cl. 175—265)

My invention relates, generally, to gas flow measuring means and it has particular relation to such means which determines the velocity of flow by ionizing molecules of the gas.

Among the objects of my invention are: To ionize molecules of the gas whose velocity is to be measured in an electric field acting transversely of the direction of gas flow; to measure the resultant current flow; to maintain a pair of spaced electrodes between which the gas flows at a predetermined potential and to ionize molecules of the gas in the space between the electrodes; to measure the current flow between the electrodes which is the result of the combined actions of the potential therebetween and the velocity of the gas; and to employ thermionic means for measuring the current flow.

Other objects of my invention will, in part, be obvious and in part appear hereinafter.

My invention is disclosed in the embodiment thereof shown in the accompanying drawing and it comprises the features of construction, combination of elements, arrangement of parts, and method of operation which will be exemplified in the construction and method set forth hereinafter and the scope of the application of which will be indicated in the appended claim.

For a more complete understanding of the nature and scope of my invention reference can be had to the following detailed description taken together with the accompanying drawing in which the single figure illustrates, diagrammatically, a preferred embodiment of my invention and method of practicing the same.

Referring now to the drawing it will be noted that the reference character 9 designates a conduit in which gas flows as indicated by an arrow 10 the velocity of which is to be measured. The gas is arranged to flow between an electrode or plate 11 and another electrode or grid 12 which are maintained at a predetermined relative direct potential by connection to terminals 13 and 14 which, as shown, are connected to a suitable source of direct potential, such as a potential of 150 volts. The molecules of the gas flowing between the electrodes 11 and 12 are indicated at 15. These molecules 15 are bombarded or ionized by alpha particles, indicated at 16, which are emitted from a radioactive foil or source 17 through the openings in the electrode or grid 12. The resultant ionized molecules or particles 15 have mass and they are moved in a direction which is a result of the combined actions of the velocity of the gas flow and the potential that is maintained between the electrodes 11 and 12.

The resultant velocity of the ionized molecules 15 of the gas due to the combined actions of the gas velocity and the transversely acting electric field maintained between the electrodes 11 and 12 may be stated:

$$Vr = \sqrt{V_p^2 + V_g^2}$$

where $Vr$ = resultant velocity
$Vp$ = velocity due to potential
$Vg$ = velocity of the gas Now, in time $t$ an ion 15 moves a distance $d$ in a direction making an angle $a$ with the electrode or plate 11. This may be stated:

$$d = Vrt$$

In the same time an ion 15 moves parallel to the electrode or plate 11 a distance $d'$. This may be stated:

$$d' = Vr \cos a \; t = Vr \; (Vg/Vr) t$$
$$d' = Vgt$$

From the foregoing it will be noted that all of the ionized molecules 15 do not reach the electrode or plate 11. Some of them are blown completely out of the electric field that is maintained between the electrodes 11 and 12 by the flow of gas therebetween. Since the radioactive material 17 continuously emits alpha particles, ions are constantly being formed at the electrode or grid 12 and current flows between it and the electrode or plate 11. For a given area of the electrode or plate 11 and electrode or grid 12, the current density will be a function of the velocity $Vp$ due to the potential maintained between the electrodes 11 and 12 and the number of ions formed per second as a result of the bombardment by the alpha particles 16 emitted from the radioactive material 17.

The current density will be a maximum when the velocity $Vg$ of the gas is zero. It will be reduced as a function of the velocity of the gas since the greater the gas velocity the more ions will be blown out of the electric field between the electrodes 11 and 12, assuming that all other factors remain constant.

In order to measure the current flow between the electrodes 11 and 12 thermionic measuring means, indicated generally at 20, may be used. The thermionic measuring means 20 may include a pair of electric valves 21 each having an anode $21a$, a grid $21g$ and a hot cathode $21c$. The cathodes $21c$ may be interconnected by a resistor 22 whose midpoint is connected through a resistor 23 to ground and to the negative terminal 14 as shown. The electrode 12 may be connected directly to one of the grids 21g and through a resistor 24 to the other 21g which also is connected to a point along a resistor 25, between the terminals 13 and 14, such that the grids 21g are maintained at a potential of about 65 volts above ground.

The thermionic measuring means 20 employs the null method of measurement in that a galvanometer 26 is connected between terminals 27 of anode resistors 28. The resistance of an adjustable resistor 29 is adjusted so that the pointer 30 of the galvanometer 26 occupies a zero position with respect to scale 31 when maximum current flows between the electrodes 11 and 12. This occurs when the velocity of the gas flow is zero. As the gas flow increases, the ionized molecules 15 are swept out of the space between the electrodes 11 and 12 proportionally to the gas velocity. The pointer 30 moves up the scale 31 a corresponding amount and, accordingly, the scale 31 may be calibrated directly in units of velocity of gas flow as desired.

Since certain changes can be made in the foregoing construction and method without departing from the spirit and scope of my invention, it is intended that all matter shown in the accompanying drawing and described hereinbefore shall be interpreted as illustrative and not in a limiting sense.

I claim as my invention:

Apparatus of the class described comprising, in combination, a first electrode, a second electrode spaced from said first electrode, means for maintaining said electrodes at a predetermined and constant direct current potential, a conduit enclosing said electrodes and disposed for the flow of gas therethrough in a direction substantially transversely of the spacing of said electrodes, and means within said conduit for ionizing the molecules of gas to produce a flow of ionized molecules from said first electrodes to said second electrode substantially transversely of the flow of gas through the conduit, said electrodes and ionizing means being arranged so that ionized particles flowing from said first electrode are deflected so as not to reach said second electrode and in amount which changes according to the velocity of the gas flow through said conduit, the means for ionizing the molecules of gas comprising a source of radioactivity and one of the electrodes comprising a grid element disposed between said source of radioactivity and the other electrode.

ALFRED A. OBERMAIER.

REFERENCES CITED

The following references are of record in the file of this patent:

UNITED STATES PATENTS

| Number | Name | Date |
|---|---|---|
| 1,411,796 | Meyer | Apr. 4, 1922 |
| 1,808,709 | Blake | June 2, 1931 |
| 2,442,824 | Poyle | June 8, 1948 |
| 2,514,235 | Genin et al. | July 4, 1950 |

FOREIGN PATENTS

| Number | Country | Date |
|---|---|---|
| 483,166 | Germany | Jan. 21, 1927 |